United States Patent [19]
Geul

[11] 3,935,427
[45] Jan. 27, 1976

[54] CAR DIAGNOSIS SYSTEM

[75] Inventor: Herman Robert Geul, Leiden, Netherlands

[73] Assignee: Sun Electric Corporation, Chicago, Ill.

[22] Filed: Dec. 26, 1973

[21] Appl. No.: 428,214

[52] U.S. Cl. ......... 235/61.7 R; 324/16 R; 73/116 R
[51] Int. Cl.² .......................................... G06K 9/08
[58] Field of Search .............. 235/61.7 R; 324/16 R; 73/116 R

[56] References Cited
UNITED STATES PATENTS

| | | | |
|---|---|---|---|
| 3,439,534 | 4/1969 | Pilgrim | 235/61.7 R |
| 3,515,339 | 6/1970 | McEwan | 235/61.7 R |
| 3,617,706 | 11/1971 | Oberhart | 235/61.7 R |
| 3,643,065 | 2/1972 | Dunigan | 235/61.7 R |

OTHER PUBLICATIONS

Instrumentation Technology, "Conputer Diagnosis of the VW," by Kaminski, 9/72; pp. 60–62.
Electronics, "Automatic Diagnosis of Engine Ailments," by Hirsch; 5/66, pp. 70–74.

Primary Examiner—Stanley M. Urynowicz
Attorney, Agent, or Firm—Molinare, Allegretti, Newitt & Witcoff

[57] ABSTRACT

In automatic diagnosis equipment for automobiles, it is essential for proper results that the datacarrier which carries the coded vehicle specifications corresponds with the vehicle to be tested. The present invention provides a system for checking correspondence between the datacarrier and the car to be tested which comprises a code-key in which the car characterizing code is recorded, said code corresponding with a code recorded on the datacarrier, and means for reading out the code on the code-key and the code on the datacarrier, for comparing them and for signaling and/or blocking the test program in the event of absence of agreement.

5 Claims, 5 Drawing Figures

CAR DIAGNOSIS SYSTEM

The invention relates to a system for checking whether or not a datacarrier, used in an automatic diagnosis-system, is in fact in the one which corresponds with the car to be tested.

In the modern automatic diagnosis-systems for cars as, for instance, described in the German publication AUTOHAUS, July 22nd, 1970, datacarriers are used on which the specifications of a certain motor vehicle are recorded in a suitable code.

As, at present, nearly every motor vehicle is made in many different models having different engines, front axle specifications, etc., it is inevitable that automatic diagnosis apparatus, which sometimes is suited only for treating cars of one single make, must use a great number of different datacarriers or program cards. This number will certainly increase in the coming years, the more so as a result of the mean lifetime of motor vehicles and the model policy of the carmakers. This leads to the real problem that when a wrong datacarrier is used, for testing a motor vehicle, the test can be of no value.

The invention aims to obviate this drawback and to provide for a system which ensures that during the test of a motor vehicle, the correct datacarrier always is used.

According to the invention, the car is combined with a code-key in which the car characterizing code is recorded, said code corresponding with a code recorded on the datacarrier, means being provided to readout the code on the code-key and the code on the datacarrier, to compare them, and to signal and/or block the progress of the test program in the event of absence of agreement.

It is clear that these measures make it totally impossible to test a vehicle in the event that the wrong datacarrier is used for the intended test of the motor vehicle.

The code-key can be a separate element, supplied with the car, or can be fixed to the car. Preferably the code-key consists of a bridging plug provided in the car which can also be used to provide the electric connections between the diagnosis apparatus and measuring points in the car in which the vehicle characterizing code is recorded by means of interconnections according to a certain pattern between contact elements.

In those cases in which the carmaker already uses such a bridging plug, the same can be used; when there are, for instance eight contact pins, of which seven might, or might not, be connected with the eighth, $2^7 = 256$ vehicles can be characterized.

It is also possible that the code-key consists of an element made from sheet material in which the code characterizing the vehicle is recorded by a certain pattern of cut-outs or surface irregularities.

The cut-outs can be formed along at least one edge of the code-key element.

The claimed invention also includes a datacarrier to be used in a system as described above and provided with code-markings corresponding with the vehicle, characterizing code, as well as a code-key to be used in a system as mentioned above.

The invention will be explained in connection with the drawings, which depict an illustrative embodiment thereof.

Figure 1:
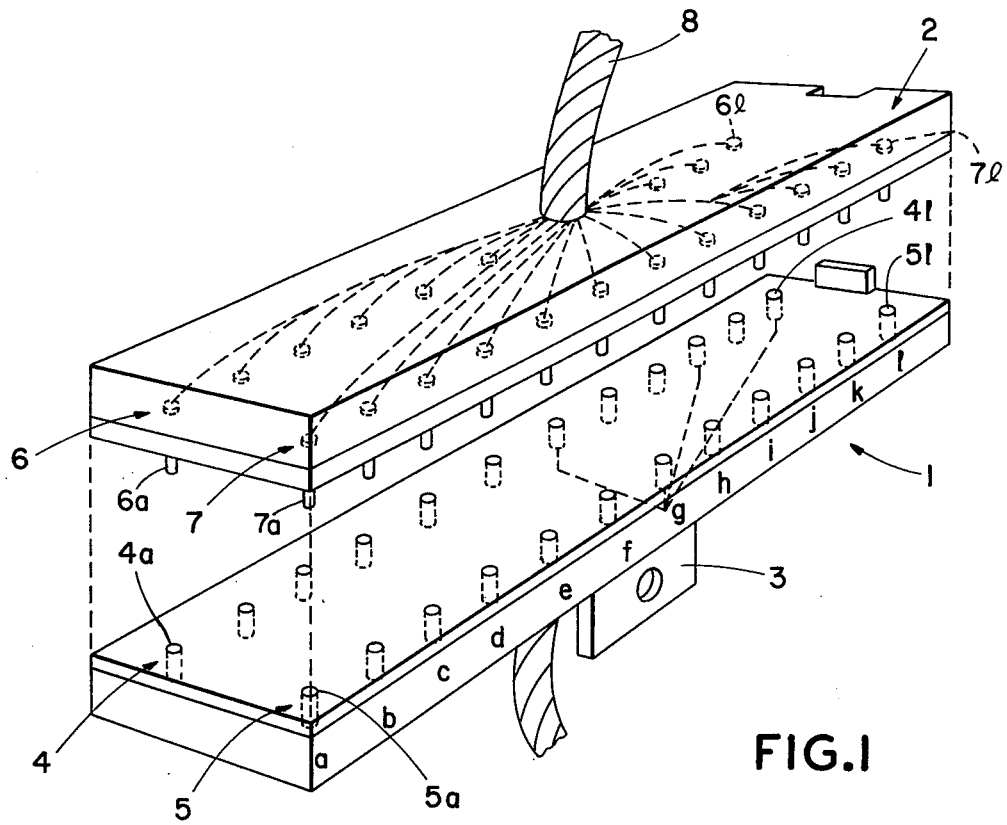
FIG. 1 is a schematic view of an embodiment in which the vehicle characterizing code is recorded in a bridging plug.

FIG. 1 shows schematically the two parts 1 and 2 of a plug such as is used in many modern vehicles for making the connections between the vehicle and an automatic diagnosis apparatus. The female part 1 of the plug is, for instance by means of a lug 3, fixed to the vehicle and has two rows of socket contacts 4 and 5. Of the row 4, the sockets 4a and 4f are used for connections between the terminals of certain measuring points of the vehicle and the diagnosis apparatus; the sockets 4g to 4l are used to record, in combination with the sockets 5h to 5l the code, which characterizes the vehicle, in binary form. Of the row 5, the sockets 5a to 5f also are connected with certain measuring points in the vehicle.

The male part 2 of the plug has the rows of contact pins 6 and 7, respectively comprising the contact pins 6a to 6l, and 7a to 7l. The contact pins 6a to 6f cooperate with the sockets 4a to 4f; the pins 7a to 7f cooperate with the sockets 5a to 5f. These pins, as understood by those skilled in the art are connected to the multiple cable 8 leading to the various elements of the diagnosis apparatus.

The code, which is characterized by the interconnections between the socket 5g on the one hand and some of the other sockets 4g..4l, 5h on the other hand is read-out in the diagnosis apparatus by ascertaining between which of the corresponding pins interconnections exist. This must correspond with the code recorded on the datacarrier if the latter correctly matches the vehicle to be tested.

It is assumed, for instance, that an interconnection corresponds with a binary 1, and that the absence of an interconnection corresponds with a binary 0. The code then is read from left to right: 100101. The datacarrier which belongs to the vehicle must also show the code 100101. This code is, as usual, the binary representation of a certain number. In the embodiment shown in FIG. 1, which utilizes a six binary digit code, the total possible number of variations is $2^6 = 64$. This number can be increased by including the sockets 5h...5l into the coding.

Figure 2:
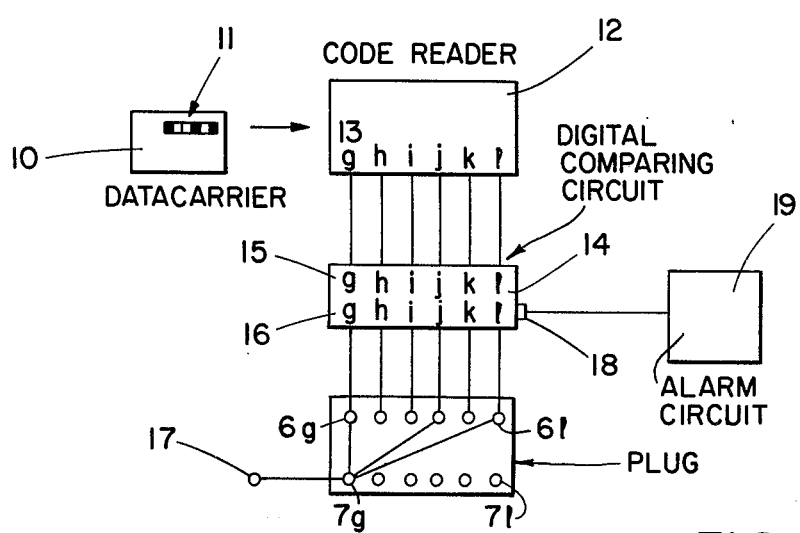
FIG. 2 is a schematic diagram of the read-out- and comparing means.

The datacarrier to be used in the diagnosis system is schematically shown in FIG. 2 and indicated by the reference numeral 10. The code is recorded thereon by means of a number of compartments 11 which are either white or filled-in black. A black compartment corresponds with a binary 1 and a white compartment with a binary 0. The card is introduced into the code-reader 12, which is for example of the type made in Germany by Ramstetter and identified as the RAMSTETTER S 474.

The outputs 13g to 13l of the code-reader 12 are connected to the inputs 15g to 15h of the digital comparing circuit 14, for example, a PHILIPS FCH 281. The other set of inputs thereof, 16g to 16l is connected with the respective pins 6g to 6l of the plug; a suitable voltage is supplied to the pin 7g through the connection 17.

When correspondence exists between the code which is read out of the datacarrier 10 by the code-reader 12, and is represented by voltages on the inputs 15g to 15l, with the through connections between the pins 6g...6l, on the one hand, 7g on the other hand, the output 18 of the comparing circuit 14 is in a first state and the test may proceed; in any other case the output 18 is in a second state and controls the alarm circuit 19 and the test is blocked.

Figure 3:
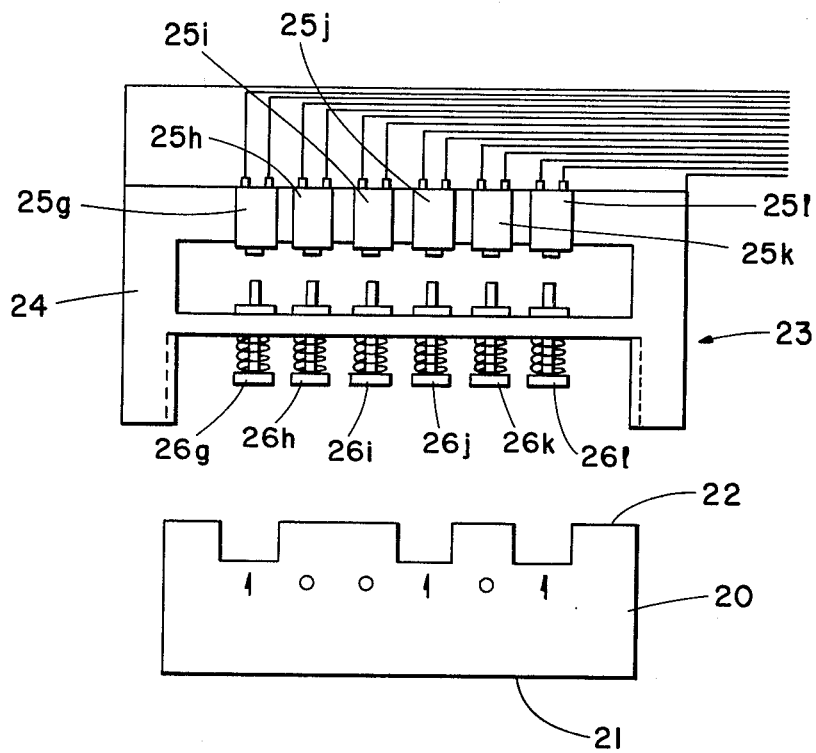
FIG. 3 is a schematic side view of another illustrative embodiment in which the code-key is a plate-like element.

FIG. 3 is a schematic view of a very simple illustrative embodiment of a code-key. This embodiment comprises a plate 20 which is supplied separately with the vehicle or can be fixed at a suitable position thereto, as for example in the motor compartment of the car.

The vehicle code with six positions is recorded by the presence or absence of cut-outs along the upper edge 22 of the plate 20. A cut-out characterizes a binary 1, and the absence of a cut-out characterizes a binary 0. Here, again, the recorded code is 100101 in the illustration of FIG. 3.

The code in the plate 20 is scanned by a code scanner 23 which comprises a frame 24 which carries six presswitches 25g to 25l of the type with normally closed contacts, cooperating with the springloaded pins 26g...26l. When the code-scanner 23 is positioned on the plate 20 the pins 26g...26l will, dependent upon the presence or the absence of a cut-out opposite thereto, be pressed upwards or not. In the illustrated embodiment the switches 25h, 25i, 25k will be opened and the switches 25g, 25j and 25l will remain closed, corresponding with the code 100101. The switches can be used with a digital comparing circuit such as the one shown in FIG. 2.

Figure 4:
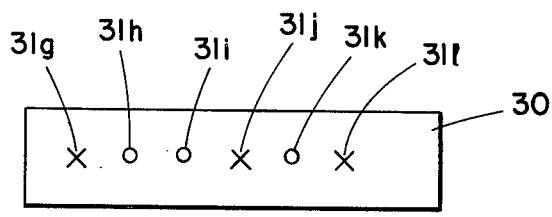
FIG. 4 is a plan view of a third illustrative embodiment of the code-key.

FIG. 4 shows schematically a code-key 30 in which the code is recorded by providing openings on a number of the code positions 31g...31l. FIG. 4 shows that an opening is present on the code positions 31h, 31i and 31k; the other positions are closed. This corresponds with the code 100101. Such a plate can be scanned by a scanner with a photocell or by a mechanical scanner.

Figure 5:
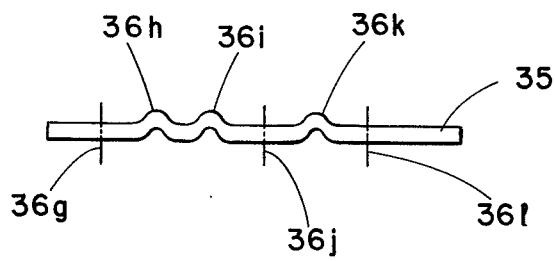
FIG. 5 is a side view of a fourth illustrative embodiment of the code-key.

FIG. 5 shows a side view of a plate-shaped code-key 35 in which the code is represented by local pressed-out parts on one of the six code-positions 36g...36l. In the positions 36h, 36i and 36k the plate is pressed out; the other code positions are flat. The presence of a pressed-out part corresponds with a binary 0 so that here again the recorded code is 100101.

It is clear that the illustrative embodiments described above are only some of many possibilities which are included within the scope of the present invention. It also is clear that the provision of the simple and cheap code-key according to the invention does not increase the price of the car. Those skilled in the art will appreciate that the read-out- and comparing circuits can be constructed very cheap with modern electronic techniques.

What is claimed is:

1. A system for checking correspondence between datacarrier, to be used in an automatic automative diagnosis apparatus, and the car to be tested, characterized in that the car is provided with a code-key in which the car characterizing code is recorded, said code corresponding with a code recorded on the datacarrier, means to read-out the code on the code-key and the code on the datacarrier, means to compare the code read-out from the datacarrier, and means to provide a signal in the event of absence of agreement between the code on the code-key and the code on the data carrier to indicate that the test program for the car should be stopped.

2. A system according to claim 1, characterized in that the code-key is secured to the car.

3. A system according to claim 1, characterized in that the code-key consists of a bridging plug provided in the car which can also be used to provide the electric connections between the diagnosis apparatus and measuring points in the car in which the vehicle characterizing code is recorded by means of interconnections according to a certain pattern between contact elements.

4. A system according to claim 1, characterized in that the code-key consists of an element, made from plate-material, in which the vehicle characterizing code is recorded by a pattern of cut-outs or surface-irregularities.

5. A system according to claim 4 characterized in that the cut-outs are formed along at least one edge of the element.

* * * * *